(12) United States Patent
Coccia et al.

(10) Patent No.: US 8,453,560 B2
(45) Date of Patent: Jun. 4, 2013

(54) COFFEE MACHINE WITH THERMALLY REGULATED DISPENSER

(75) Inventors: Andrea Coccia, Binasco (IT); Claudio Volonte, Binasco (IT)

(73) Assignee: Gruppo Cimbali S.p.A., Binasco, Milan (IT)

( * ) Notice: Subject to any disclaimer, the term of this patent is extended or adjusted under 35 U.S.C. 154(b) by 792 days.

(21) Appl. No.: 12/482,119

(22) Filed: Jun. 10, 2009

(65) Prior Publication Data
US 2009/0308255 A1 Dec. 17, 2009

(30) Foreign Application Priority Data
Jun. 11, 2008 (EP) ..................................... 08425413

(51) Int. Cl.
*A47J 31/047* (2006.01)
(52) U.S. Cl.
USPC ........................................................... 99/281
(58) Field of Classification Search
USPC ........................................... 99/281, 293, 279
See application file for complete search history.

(56) References Cited

U.S. PATENT DOCUMENTS

| | | | |
|---|---|---|---|
| 4,583,449 A * | 4/1986 | Dangel et al. ..................... | 99/279 |
| 7,654,191 B2 * | 2/2010 | Greenwald et al. ............. | 99/275 |
| 2006/0060090 A1 * | 3/2006 | Gantt et al. ....................... | 99/279 |
| 2006/0130666 A1 * | 6/2006 | Bardazzi .......................... | 99/279 |
| 2007/0169635 A1 * | 7/2007 | Bienvenu et al. ................ | 99/279 |
| 2008/0017041 A1 * | 1/2008 | Beretta ............................. | 99/279 |
| 2008/0260927 A1 * | 10/2008 | Steenhof et al. ............... | 426/569 |
| 2009/0120299 A1 * | 5/2009 | Rahn et al. ....................... | 99/279 |
| 2009/0308255 A1 * | 12/2009 | Coccia et al. .................... | 99/281 |

FOREIGN PATENT DOCUMENTS

| | | |
|---|---|---|
| EP | 0465877 A1 | 1/1992 |
| EP | 0622041 A1 | 11/1994 |
| EP | 1360918 A1 | 11/2003 |
| EP | 1882433 A1 | 1/2008 |
| FR | 2483762 A1 | 12/1981 |
| GB | 1416355 A | 12/1975 |

OTHER PUBLICATIONS

European Search Report annex and listing of cited references (2 pages) (dated Dec. 9, 2008).

\* cited by examiner

*Primary Examiner* — Gene Kim
*Assistant Examiner* — M Chambers
(74) *Attorney, Agent, or Firm* — Rothwell, Figg, Ernst & Manbeck, P.C.

(57) ABSTRACT

A coffee machine for producing and dispensing coffee-based beverages, comprising: a water supply pipe (11); at least one dispensing device (13) comprising an infusion unit (15) apt to contain coffee powder, wherein said dispensing device (13) includes an infusion body (14) apt to admit water into said infusion unit (15) when said infusion unit is engaged with said dispensing device (13), a heating chamber (12) in fluid communication with the supply pipe (11), the heating chamber (12) comprising heating means (20) and being provided with an outlet (24) for permitting the admission of water at a dispensing temperature (T2) into a connecting pipe (23) in fluid communication with the infusion body (14) via a shut-off valve (26). The water supply pipe (11) is in fluid communication with a source of water (7) at a feed temperature (T1) and thermally coupled to a heat source (5), the feed temperature (T1) being less than said dispensing temperature (T2).

1 Claim, 1 Drawing Sheet

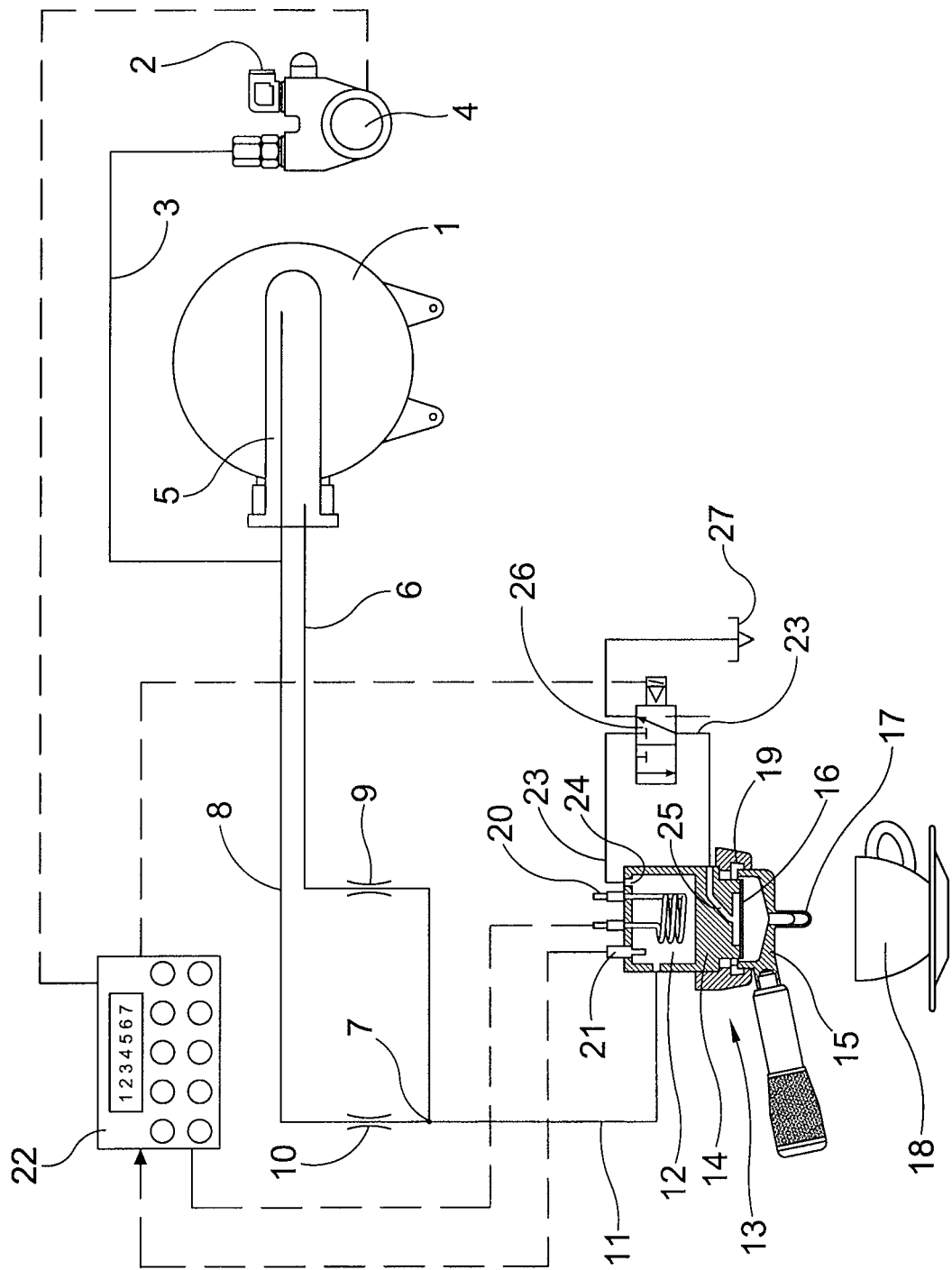

COFFEE MACHINE WITH THERMALLY REGULATED DISPENSER

BACKGROUND OF THE INVENTION

1. Field of the Invention

The present invention relates to a coffee machine for producing and dispensing coffee-based beverages.

2. Background Art

Coffee, as a beverage, has always been widely used and prized; nowadays, in fact, it occurs in numerous varieties, which differ from one another both in the starting mixture, and in the method of extraction of the beverage.

In particular, espresso coffee is a beverage obtained instantaneously by using a coffee machine which passes hot water through a layer of ground coffee contained in an infusion chamber, generally a metal filter. The water which passes through the layer of coffee must be heated to a certain temperature and is subjected to a certain pressure, where the optimum pressure and temperature are selected also according to the starting mixture. Typically, the temperature of the water admitted into the infusion chamber is between around 88 and 98° C. and the pressure varies from around 0.8 to 1.5 bar in the initial dispensing period, rising then to around 9 bar during the extraction of the beverage.

As is known, among the items of equipment used in bars, hotels and restaurants and, even more, also among the items of equipment for domestic use, what is commonly termed an espresso coffee machine is in reality an apparatus which, besides espresso coffee, also provides many other services. With these machines it is in fact possible to dispense hot water for the production of infusions such as tea and camomile tea, to dispense superheated steam which, with its thermal and kinetic energy, makes it possible to heat the milk rapidly and to form the fine froth which characterizes cappuccino.

In the majority of machines for espresso coffee that are currently used, the boiler for heating the water is separate from the dispensing assembly and from the infusion chamber.

Italian Patent No. 1131532 describes a coffee machine which comprises a water supply circuit in which the flow of water is controlled by a pump, a boiler for obtaining steam under pressure, and at least one dispensing assembly equipped with a filter-holder into which coffee powder is inserted and measured. Each dispensing assembly comprises a mini-boiler equipped with self-contained thermal regulation and the water supply circuit extends in a manner suitable for supplying, in parallel, the boiler and each mini-boiler.

European Patent Application No. 1 360 918 discloses an espresso coffee machine having a plurality of dispensing units, connected to a source of cold water under pressure, and provided with a solenoid valve for shutting-off the water which is to be supplied, wherein each dispensing unit comprises a separate mini-boiler connected to the water source and provided with an electrical resistance element connected to electrical supply conductors by means of a separate switch and thermostat.

European Patent Application No. 1 882 433 describes a hydraulic circuit for a coffee machine in which an external water supply source and the dispensing device are placed in fluid communication with each other via a cold water pipe and a hot water pipe which provides heating means, wherein the cold water pipe and the hot water pipe join one another at a mixing point upstream of the dispensing device. In the body of the dispensing device of the machine a heat generator is arranged, separate from the heating means interposed upstream of the hot pipe, to compensate for the heat losses of the dispensing body which are due to dissipation into the external environment. Upstream of the mixing point, two solenoid valves are disposed respectively on the cold pipe and on the hot pipe. The solenoid valves are operated by control means which regulate the flow rate respectively of the respective pipes and therefore the temperature of the water which flows downstream of the mixing point.

The Applicant has observed that a system for controlling the temperature of the water sent to the coffee infusion chamber of the dispensing device, comprising a plurality of solenoid valves for regulating the temperature of the water supplied, increases not only the costs of production of the machine, but also those for maintaining same.

The Applicant has further observed that in a hydraulic system which provides for a dispensing device provided with a mini-boiler fed directly by the mains water system, although the volume of water contained in the mini-boiler is relatively limited, a certain time is however required to bring the water to the temperature suitable for the preparation of the coffee and this is with a relatively high consumption of electric power. For example, the electric power used to raise the temperature of the water from "ambient" temperature (for example 10-20° C.) at which the water leaves the mains water system, to the temperature necessary for the preparation of an espresso coffee (for example 90° C.), may be around 0.8-2.5 kW, depending also on the quantity of beverage to be dispensed, with a consequent high consumption of electric power.

SUMMARY OF THE INVENTION

It is an aim of the present invention to provide a coffee machine in which the costs of production and maintenance are reduced.

A further aim of the present invention is that of providing a coffee machine which has a reduced power consumption and which at the same time has a hydraulic circuit which permits prompt dispensing of water for the infusion of the coffee at a temperature suitable for the production of coffee of the desired type.

These and other aims which will become clearer from the following description are achieved by means of the coffee machine according to the invention, which in general terms is directed to a coffee machine for producing and dispensing coffee-based beverages, comprising: a water supply pipe; a heat source; at least one dispensing device comprising an infusion unit apt to contain coffee powder, wherein said dispensing device includes an infusion body apt to admit water into said infusion unit when said infusion unit is engaged with said dispensing device; and a heating chamber in fluid communication with said supply pipe, said heating chamber comprising heating means and being provided with an outlet for permitting the admission of water at a dispensing temperature into a connecting pipe in fluid communication with said infusion body via a shut-off valve, wherein said water supply pipe is in fluid communication with a source of water at a feed temperature, said water source being thermally coupled to said heat source, and said feed temperature being less than said dispensing temperature.

BRIEF DESCRIPTION OF THE DRAWINGS

The characteristics and advantages of the present invention will become clear from the following detailed description of a practical embodiment, provided by way of a non-limiting example with reference to the appended drawing, in which:

FIG. 1 shows diagrammatically a hydraulic circuit and a control circuit for a coffee machine according to an embodiment in accordance with the present invention.

DETAILED DESCRIPTION

With reference to the drawing, the reference 1 indicates a conventional boiler for an espresso coffee machine, for the production of hot water and steam. The boiler is fed, in a conventional manner, not indicated in the drawing, by an external cold water source indicated by 2.

The same water source 2, via a pipe 3 and a pump 4, feeds a heat exchanger 5, also conventional in an espresso coffee machine, and positioned within the boiler 1.

The outlet of the heat exchanger 5, via a pipe 6, feeds heated water to a mixing point 7 which is also reached by a pipe 8 connected to the pipe 3, bringing cold water.

On the hot water pipe 6 and on the cold water pipe 8, upstream of the mixing point 7, respective flow regulators indicated respectively by 9 and 10 are inserted.

The flow regulators make it possible to mix the cold water with the hot water in such a way as to obtain a flow of hot water at a predetermined temperature T1 in the pipe 11 which, downstream of the mixing point 7, reaches a heating chamber 12, in the form of a mini-boiler, mounted on board the coffee dispensing device, indicated as a whole by 13.

The dispensing device 13, in a conventional manner, comprises an infuser body 14 which, in the example illustrated, is formed by the base of the heating chamber 12, an infusion unit formed by a filter-holder 15, with filter 16 and nozzle 17, for dispensing the coffee, below which is located in an operating position, in an equally conventional manner, a collecting coffee cup 18.

Connecting means 19 are provided on the infuser body 14 for the removable connection of the filter-holder 15.

Located inside the heating chamber 12 is an electrical resistance 20 for heating the water up to a temperature T2 suitable for the formation of the coffee beverage, which temperature will be higher than the temperature T1 of the water downstream of the mixing point 7 which performs the function of a source with respect to the heating chamber 12. The operation of the heating resistance 20 is controlled by a temperature sensor 21 and by the electronic central programming unit (CPU) shown diagrammatically at 22.

The water at the stabilised temperature in the heating chamber 12 is brought to the infusion unit, i.e. to the filter-holder 15, via a pipe 23 which connects the outlet 24 of the chamber 12 to the channel 25 provided in the dispensing body 14 and which empties out directly upstream of the filter 16.

Located in the pipe 23 is a solenoid valve 26, also controlled by the control unit 22.

In one position, the solenoid valve 26 effects the feeding of the water to the filter-holder and therefore the formation of the beverage, and in the other position interrupts the feeding of the water and is in communication with a discharge 27 outside the machine.

According to the present invention, the water admitted into the heating chamber 12 by the feed pipe 11 is already at a relatively high temperature T1 (for example, not less than around 80° C.) and therefore the heating time required to reach the optimum temperature T2 for the formation of the beverage (for example, around 90° C.), is reduced, with a consequent reduction in the time for the preparation of the beverage and above all eliminating waiting times between the dispensing of one measured amount of coffee and the next, due to having to wait until the water reaches the required temperature.

According to one embodiment, the temperature T1 is from 10 to 20° C. lower than the temperature T2. Moreover, the electrical power necessary for the electrical resistance 20 required for raising and stabilising the temperature to the temperature T2 for the preparation of the beverage is relatively low, for example not more than 0.8 kW, even for the dispensing of relatively large quantities of beverage, for example 120-250 $cm^3$.

Although only one dispensing device 13 is indicated in the drawing, the present invention envisages a coffee machine which comprises a plurality of dispensing devices, each defined according to the teaching described above.

The invention claimed is:

1. A coffee machine for producing and dispensing coffee-based beverages, comprising:
    a water supply pipe;
    a heat source;
    at least one dispensing device comprising an infusion unit apt to contain coffee powder, wherein said dispensing device includes an infusion body apt to admit water into said infusion unit when said infusion unit is engaged with said dispensing device;
    a heating chamber in fluid communication with said water supply pipe and mounted on the at least one dispensing device, said heating chamber comprising heating means and being provided with an outlet for permitting the admission of water at a dispensing temperature into a connecting pipe in fluid communication with said infusion body via a shut-off valve connected to a control unit, and
    a temperature sensor configured to control operation of the heating means in the heating chamber and connected to the control unit
    wherein the shut-off valve controlled by the control unit effects, in one position, the admission of water at the dispensing temperature to the infusion unit,
    wherein said water supply pipe is in fluid communication with a source of water at a feed temperature, said water source being thermally coupled to said heat source and said feed temperature being from 10° C. to 20° C. lower than said dispensing temperature, and
    wherein said water source is connected upstream of said water supply pipe to a hot water pipe thermally coupled to said heat source, and to a cold water pipe in fluid communication with a water source outside the machine, said cold water pipe and said hot water pipe each comprising a flow regulating element for regulating a flow rate of cold water and hot water, respectively, to obtain a flow of water at the feed temperature wherein said water source is formed by a mixing junction between said cold water pipe and said hot water pipe and wherein said heat source comprises a heat exchanger in thermal contact with heating means.

* * * * *